United States Patent
Akutsu et al.

[11] Patent Number: 5,883,585
[45] Date of Patent: Mar. 16, 1999

[54] ON-ROAD OBJECT DETECTING SYSTEM

[75] Inventors: Eisaku Akutsu; Yoshihiro Ohkuwa, both of Susono, Japan

[73] Assignee: Toyota Jidosha Kabushiki Kaisha, Japan

[21] Appl. No.: 882,159

[22] Filed: Jun. 25, 1997

[30] Foreign Application Priority Data

Jun. 27, 1996 [JP] Japan .................................. 8-167875

[51] Int. Cl.⁶ ...................................................... G08G 1/01
[52] U.S. Cl. ......................... 340/933; 340/941; 340/942; 340/988; 200/86 A; 701/117
[58] Field of Search ................... 240/933, 988, 240/991, 992, 993, 942, 941, 940, 938, 939; 342/70, 71; 200/85 R, 86 A, 86 R; 324/236, 238, 244, 654, 655; 364/436, 438, 565; 701/117, 118, 119, 301

[56] References Cited

U.S. PATENT DOCUMENTS

| | | | |
|---|---|---|---|
| 3,626,413 | 12/1971 | Zachmann | 340/933 |
| 3,691,519 | 9/1972 | Wolf | 340/933 |
| 3,737,851 | 6/1973 | Marshall et al. | 340/933 |
| 3,840,848 | 10/1974 | Marshall et al. | 340/933 |
| 3,900,830 | 8/1975 | Peterson | 340/933 |
| 3,906,492 | 9/1975 | Narbaits-Jaureguy et al. | 340/933 |
| 3,964,063 | 6/1976 | Narbaits-Jaureguy et al. | 340/933 |
| 4,276,539 | 6/1981 | Eshraghian et al. | 340/933 |
| 4,552,456 | 11/1985 | Endo | 356/5 |
| 5,134,393 | 7/1992 | Henson | 340/933 |
| 5,164,732 | 11/1992 | Brockelsby et al. | 340/933 |
| 5,455,669 | 10/1995 | Wetteborn | 356/5.01 |

FOREIGN PATENT DOCUMENTS

| | | |
|---|---|---|
| 3-260897 | 11/1991 | Japan . |
| 5-325091 | 12/1993 | Japan . |
| 6-309587 | 11/1994 | Japan . |
| 6-333193 | 12/1994 | Japan . |

*Primary Examiner*—Nina Tong
*Attorney, Agent, or Firm*—Finnegan, Henderson, Farabow, Garrett & Dunner, L. L. P.

[57] ABSTRACT

A system for detecting an object located on a travelling path even in bad weather or during nighttime in which conducting wires having a predetermined impedance value are laid along a travelling path, and a signal is supplied to the conducting wires from a signal source. If a vehicle exists on the path, the impedance of the conducting wires changes at the position where the vehicle is present. A signal reflected from the impedance change position is detected by a detector. The position of the vehicle can be determined from the timing of the received reflection signal. It is also possible to detect a vehicle changing lanes or the like by means of a plurality of conductive wires laid along the travelling path. Instead of a conducting wire, an optical fiber may be provided for determining the position of a vehicle using the refractive index change in the optical fiber due to the weight of the vehicle.

10 Claims, 9 Drawing Sheets

ON-ROAD OBJECT DETECTING SYSTEM

BACKGROUND OF THE INVENTION

1. Field of the Invention

This invention relates to a system for detecting an on-road object, and more particularly to an on-road object detecting system which uses changes in propagation characteristics of a signal propagating member.

2. Description of the Related Arts

On-road monitoring systems for monitoring vehicles, displaced articles such as dropped articles or the like located on the road have been conventionally proposed in order to secure safe running of vehicles and smooth traffic flow.

For example, Japanese Patent Laid-Open Publication No. Hei 6-333193 discloses a technique for recognizing the presence of passing vehicles from an image obtained by monitoring cameras disposed at predetermined positions on a road.

In the above-mentioned prior art, however, since the objects are recognized by processing the obtained image data, it is difficult to make such a recognition during night time or under the conditions of rain or fog, when sufficient image contrast cannot be obtained. It is of course possible to overcome the influence of weather, for example, by a technique in which changes in the oscillation frequency of a vehicle passing on coils buried under a road are detected so as to recognize the vehicle (Japanese Patent Laid-open Publication Nol. Hei 6-309587, for example). However, such a technique is not a satisfactory solution because vehicle recognition is performed only where coils are buried and it is not possible to detect traffic flow through the entire road or any displaced articles located at points where no coils are buried.

SUMMARY OF THE INVENTION

The present invention is intended to overcome the foregoing problems of the prior art, and provides a system for infallibly detecting traffic flow, on-road articles or the like, regardless of environmental conditions including time or weather.

To achieve the objects and in accordance with the purpose of the invention, as embodied and broadly described herein, the on-road object detecting system of this invention comprises propagating means for propagating a signal along a travelling path and having propagation characteristics that change due to the presence of an on-road object, signal generating means for feeding the signal to the propagating means, the signal propagated by the propagating means being reflected in the propagating means at the occurrence of a change in the propagation characteristics, signal receiving means for receiving the reflection signal reflected from the change in propagation characteristics of the propagation means caused by the on-road object, and detecting means for detecting the position of the on-road object based on the timing of the received reflection signal at the signal receiving means. The object recognition is thus performed by such active operations as signal supply to the propagating means and reception of a reflection signal therefrom. Therefore, it is possible to detect not only the presence of objects at certain points, as was the case in the conventional art, but also the traffic flow along the travelling path without being affected by time or weather.

The propagating means may be, for example, a conducting wire having a predetermined impedance value. The propagation characteristic change portion may be a portion where an impedance inconsistency is generated due to the on-road object.

Alternatively, the propagating means may be an optical fiber having a predetermined refractive index. The propagation characteristic change portion may be a portion where the refractive index is changed due to the on-road object.

A plurality of the propagating means are located in the width direction of the travelling path. The detecting means detects the position of the on-road object at each of the propagating means. Further, judging means is further included for judging at least the type of on-road object based on the positional change of the on-road object as time elapses.

Further, an on-road object detecting system according to the presence invention comprises a cable, disposed along a travelling path, whose propagation characteristics change due to the presence of an on-road object, a signal generator for supplying a signal to the cable, a signal receiver for receiving a reflection signal fed from propagation characteristic change portion generated by the on-road object, and a processor for detecting the position of the on-road object based on the receiving timing of the signal receiver.

Here, the cable includes a conducting wire having a predetermined impedance value, and the signal generator supplies an alternating signal to the cables.

Alternatively, the cable is a conducting wire having a predetermined impedance value, and the signal generator supplies a pulse signal to the cables.

The cable may be also an optical fiber having a predetermined refractive index, and the signal generator supplies a laser beam to the cables.

BRIEF DESCRIPTION OF THE DRAWINGS

The present invention will become more apparent from the following detailed description of presently preferred embodiments when taken in conjunction with the accompanying drawings.

DESCRIPTION OF THE PREFERRED EMBODIMENTS

Preferred embodiments of the present invention will be now described with reference to the drawings.

FIRST EMBODIMENT

Figure 1:
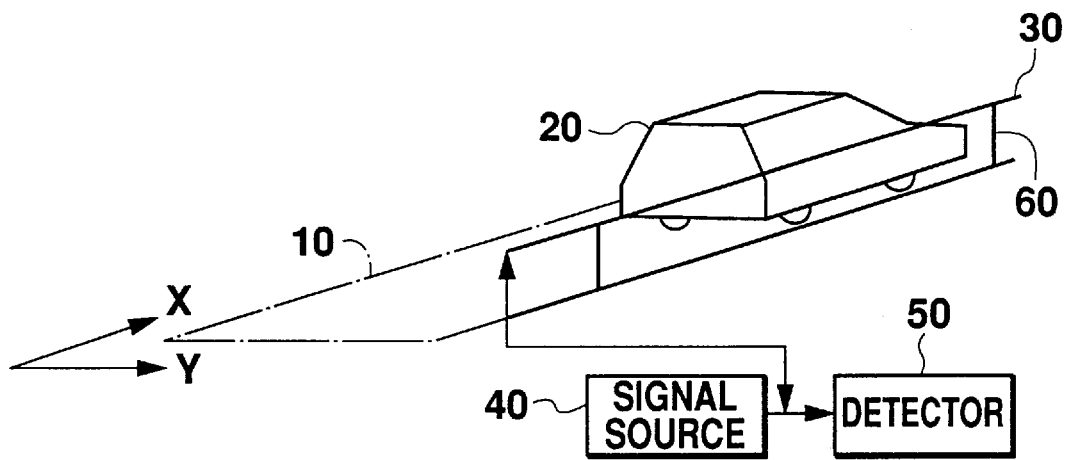
FIG. 1 is a conceptual view showing the structure of a first embodiment of the present invention.

FIG. 1 shows a conceptual structure of a first embodiment of the present invention. A vehicle 20 passes through a travelling path 10 along which a conducting wire 30 is provided. The conducting wire 30 is provided in the direction of X in FIG. 1 along the travelling path with the aid of, for example, fixing poles 60. Although not shown in FIG. 1, the conducting wire 30 is similarly disposed in the direction of -X in the figure. In this figure, Y indicates the width direction of the travelling path, which is orthogonal to the direction of X. A fixed impedance value with respect to the ground can be obtained by the conducting wire 30 being thus continuously located along the traveling path 10. A predetermined signal is supplied to the conducting wire 30 from a signal source 40. As will be described later, an alternating signal or pulse signal of a predetermined frequency is used for this signal. Now, if a passing vehicle 20 exists within a range where the conducting wire 30 is located, the impedance value of the conducting wire 30 changes under the influence of the passing vehicle which is a conducting member, and an impedance inconsistency portion is generated in the conducting wire 30 at the position where the vehicle 20 exists. The electrical signal fed from the signal source 40 is reflected by this impedance inconsistency portion and is then detected by a detector 50. Since a time required for reception of this refection signal is proportional to the distance between the end of the wire and the impedance inconsistency portion, the position of the vehicle 20 can be specified based on the reception timing of the reflection signal.

Figure 2:
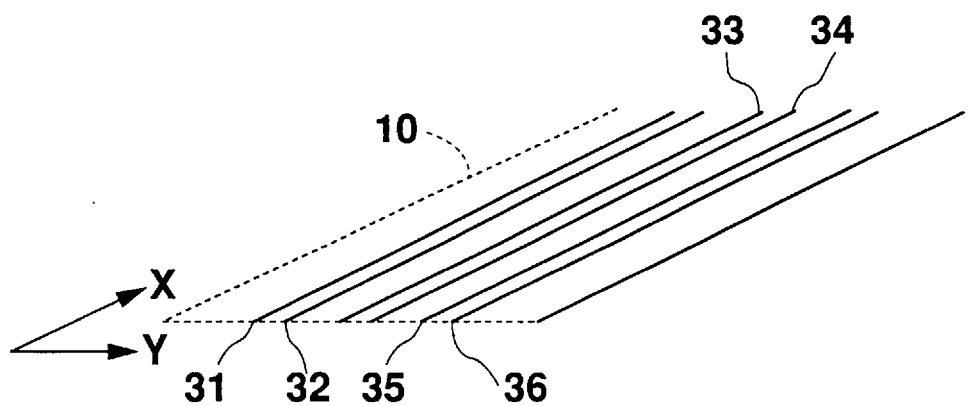
FIG. 2 is an explanatory view showing buried cables.

FIG. 2 shows a specific explanatory view in which the conducting wires are laid. As shown in FIG. 2, a plurality of conducting wires are laid over the surface of the travelling path in the width direction thereof. In FIG. 2, six conducting wires 31, 32, 33, 34, 35, and 36 are shown; a pair of conducting wires 31 and 32 are positioned at the left side of the path, a pair of conducting wires 33 and 34 are positioned in the center of the path, and a pair of conducting wires 35 and 36 are positioned at the right side of the path. To each of the conducting wires, a signal source and a detector is connected, respectively, in the same manner as in FIG. 1. A processing section which consists of a microcomputer and a memory is further provided for specifying the position of an object from the detection result inputted by each detector.

As described, pairs of conducting wires are laid at the center and both sides of the travelling path. Therefore, if a vehicle is positioned substantially at the center of the path, each pair of conducting wires detect this object. However, once the vehicle 20 is off the center of the path after changing lanes or meandering, the object cannot be detected by either pair of conducting wires disposed at the right or left side of the path. Accordingly, in the event where all the pairs of conducting wires detect the object at one point in time, but one of the pairs positioned at the right or left of the path no longer detects the object at another point in time, the processing section judges that the object has moved in the direction of the pair still detecting the object. Conversely, if none of the pairs of conducting wires detect any objects at one point in time, and then the right side pair of conducting wires detect an object at a subsequent point in time and further the center pair of the conducting wires also detect the object at a further subsequent point in time, the processing section can judge that a vehicle has entered the lane.

When an object is detected, the position of the object is sequentially stored in a memory. It is then possible to determine whether the object is moving or not from the temporal change of the position, that is, whether the on-road object is a still object such as a displaced article or a moving object such as a vehicle. Further, in the case of a moving object, it is possible to detect the moving speed of the object from the amount of temporal change in the position and to recognize the traffic flow. For example, if a plurality of vehicles each travelling at approximately 20 km/h are detected, it is determined that there is a traffic jam. It is also possible to determine that an accident has happened if an object which was moving at one moment and then suddenly becomes stationary the following moment is detected.

Now, the processing of a signal supplied to the conductive wire and of a reflection signal from the impedance inconsistency portion will be described.

Figure 3:
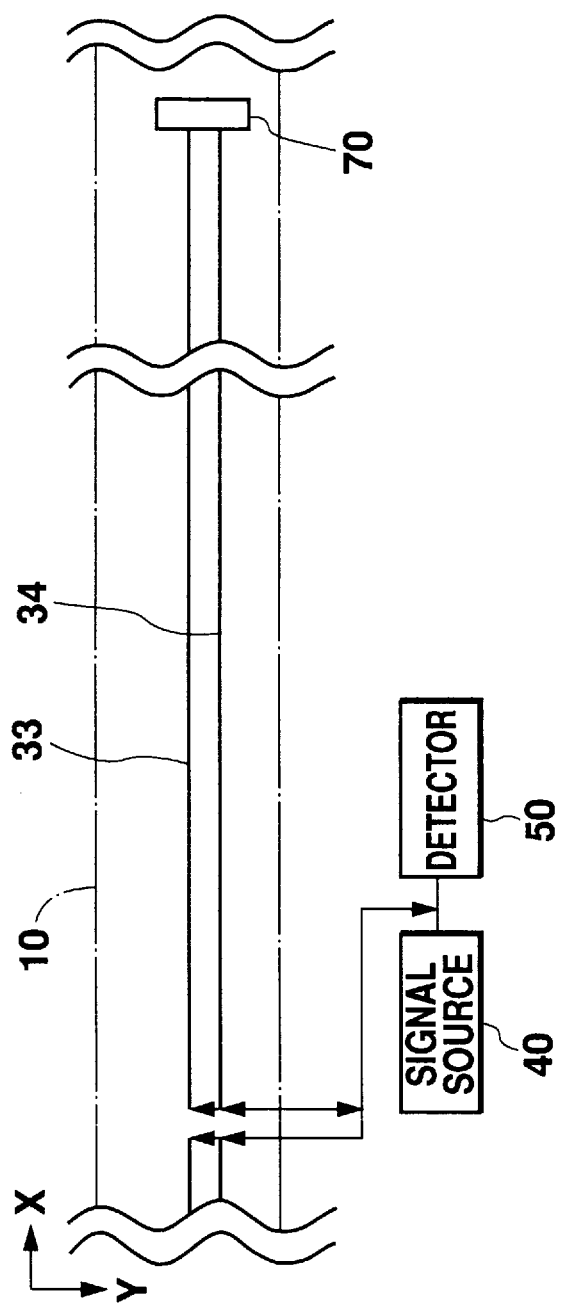
FIG. 3 is a structural block diagram of the first embodiment of the present invention.

FIG. 3 is a plan view of one pair of conductive wires 33, 34 shown in FIG. 2. In this example, a resistor 70 having the same impedance value as the conductive wires is connected at one end of the conductive wires, for the following reason. If this end is an open end, a supplied electrical signal is totally reflected at this end and is then inputted into the detector 50 as a reflection signal. Therefore, the resistor 70 is provided so as to prevent any such reflection signals from being generated by anything other than an on-road object and to increase the S/N ratio of a reflection signal generated from the object. However, as the conductive wires have a known length (for example, 100 m), it is possible to distinguish a reflection signal generated from an on-road object from a reflection signal generated from an open end, even if the conductive wire has an open end. Therefore, detection of an object is possible even without the resistor 70.

Figure 4:
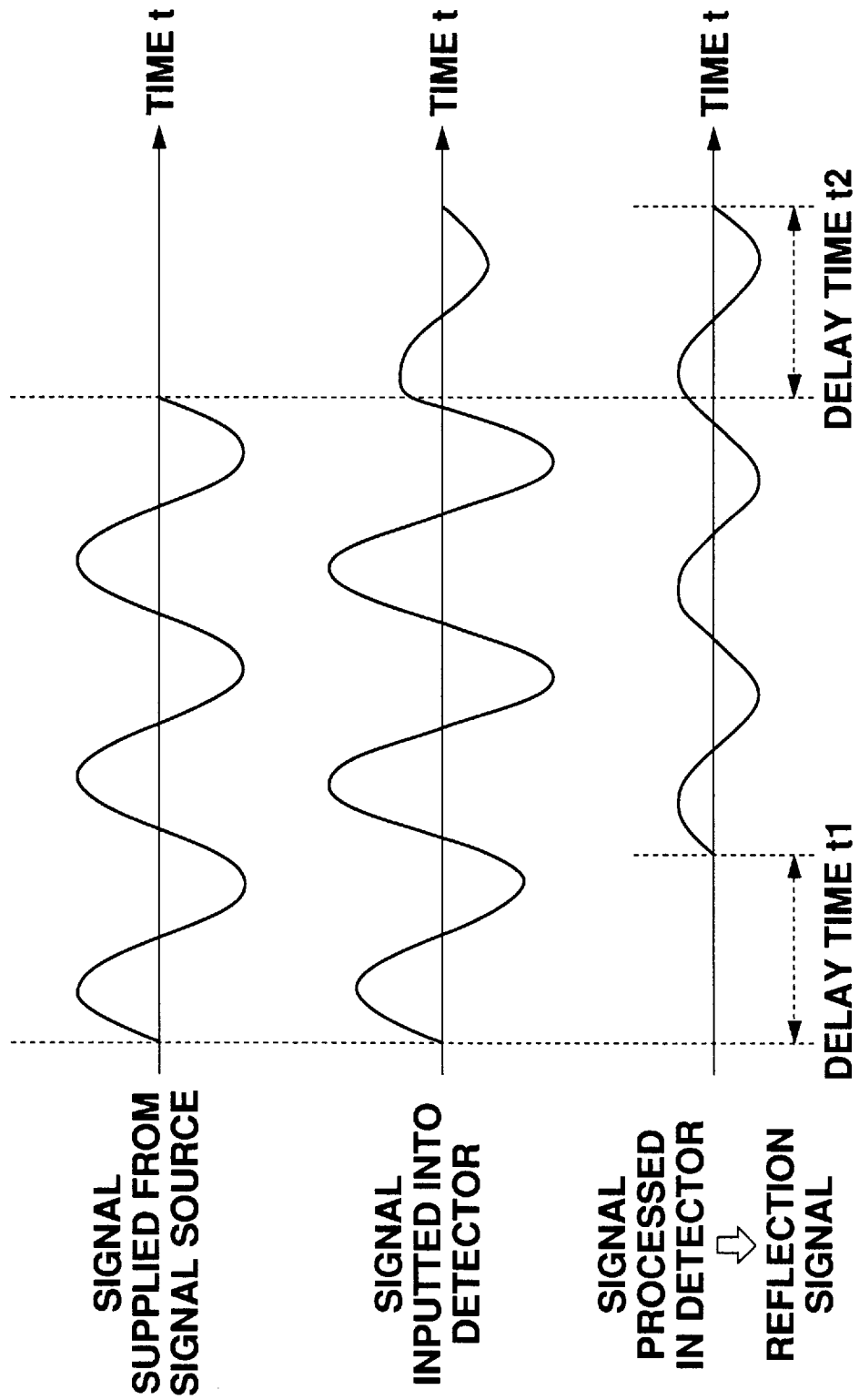
FIG. 4 is a timing chart of a supplied signal and a reflection signal.

FIG. 4 shows the waveform of an electrical signal supplied from the signal source 40 to conductive wire (A), the waveform of a signal inputted into the detector 50 (B) and the waveform of a reflection signal obtained by processing in the detector 50 (C). An alternating signal having a predetermined frequency (for example, 1 GHz) supplied from the signal source 40 is reflected at the position where an object such as a vehicle is present, and is then inputted into the detector 50. In this manner, a signal (B) obtained by superimposing this reflection signal onto the original alternating signal is inputted into the detector 50, and the detector 50 subtracts a signal synchronized with the original alternating signal from this inputted signal to extract a reflection signal (C). As the thus extracted signal is a signal generated from the position where the object exists, the start timing of this signal represents the distance from the other end of the conducting wires to the object. This timing is denoted as a delay time t1 in FIG. 4. It is also possible to find the distance from the end timing delay of the reflection signal (delay time t2).

Specifically, the expression of 2L=C.t1 is obtained, where C is a signal speed and L is a distance. It is further possible to find this distance from the waveform of a standing wave generated by superimposition of a reflection signal and a supplied signal at the impedance inconsistency portion.

Figure 5:
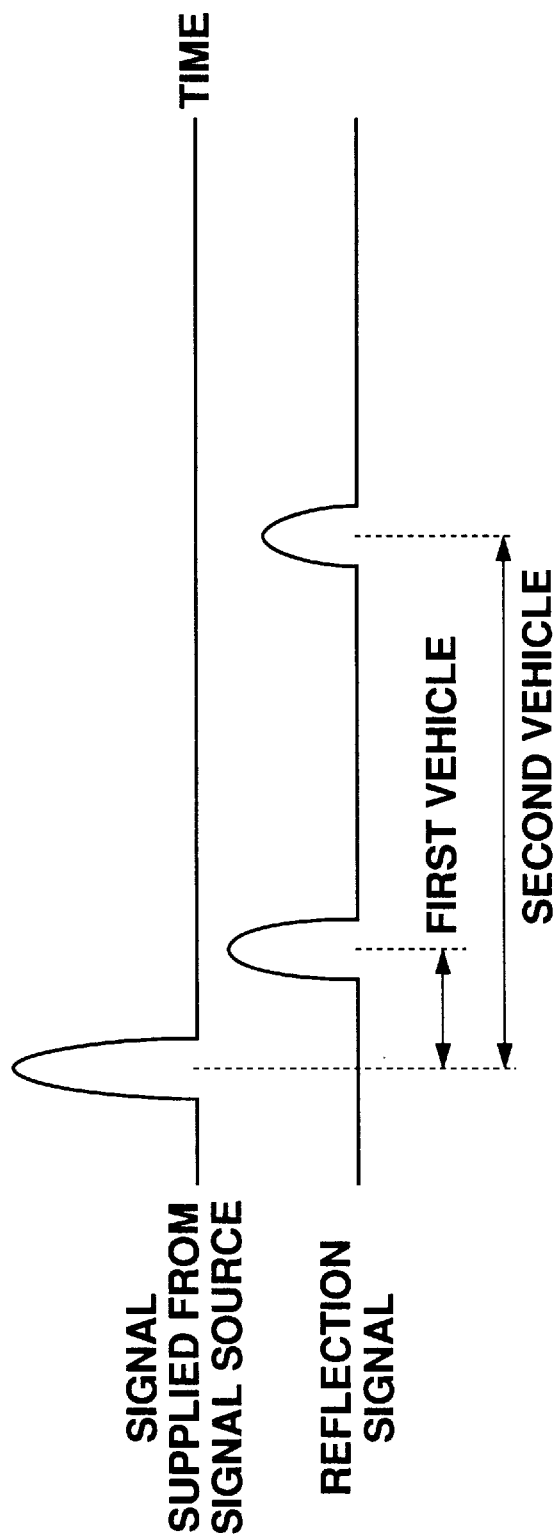
FIG. 5 is a timing chart illustrating a relationship between vehicles and reflection signals.

FIG. 5 shows another signal waveform of this embodiment when a pulse signal is supplied to the conductive wires. Pulse signals are supplied at intervals of 1 ms, for example, and a reflection pulse from the impedance inconsistency portion, that is from where a vehicle exists, is detected by the detector 50. FIG. 5 shows one pulse supplied to the conductive wire (A) and reflection pulses (B). If only one object exists, only one reflection pulse is detected. However, if two vehicles are running along a path, two reflection pulses are detected. In this case, the first pulse reception timing represents the distance to the first vehicle, while the second pulse reception timing represents the distance to the second vehicle. Even in the case where more than three vehicles are running along the path, the positions of these vehicles can be similarly detected from the reception timing of each pulse.

Figure 6:
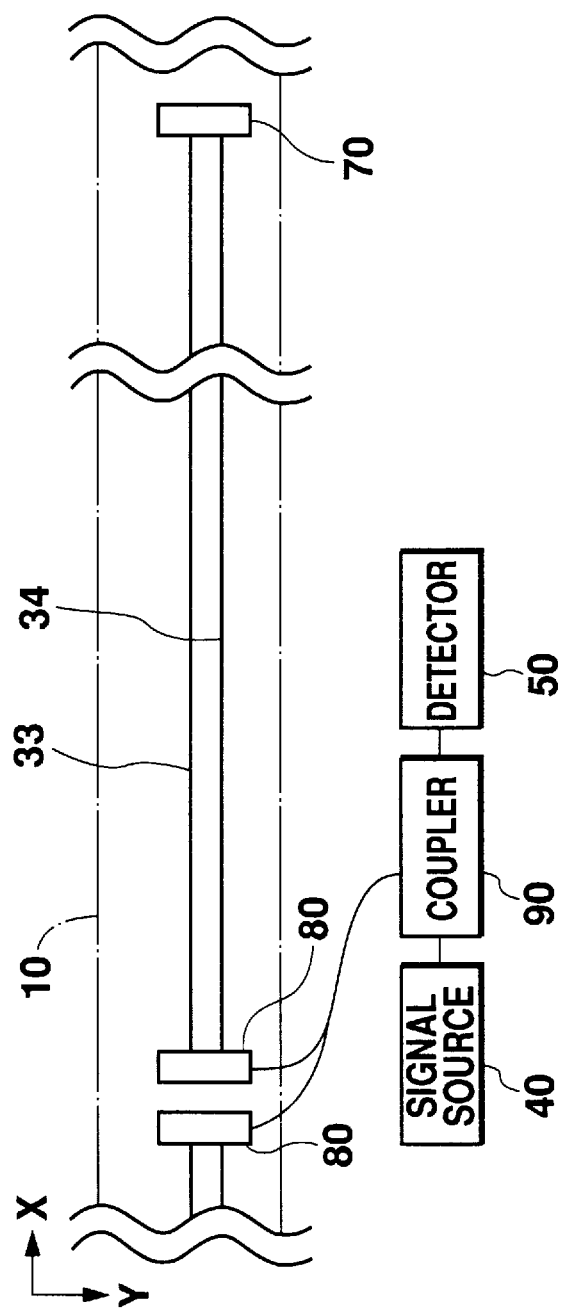
FIG. 6 is another structural block diagram of the first embodiment of the present invention.

FIG. 6 shows another example of structure according to this embodiment. The system of FIG. 6 differs from that in FIG. 3 by the provision of an impedance converter 80 for converting and matching impedance variations of the vehicle detection section which consists of the signal source 40, the detector 50 and the conductive wires and the provision of a coupler 90 for separating a signal outputted from the signal source 40 and a reflection signal fed back to the detector as a detection signal. A so-called directional coupler or a circulator circuit may be used as the coupler 90.

As the signal source 40 is generally located at a distance from the travelling path 10, it is necessary to provide a supply line for supplying a signal from the signal source 40 to the conductive wires. A coaxial cable or the like can be used as this supply line. The conductive wires 33, 34 are provided in the form of two parallel lines, for example, so as to optimize the detection sensitivity. Therefore, there is a significant impedance difference between the conductive wires and the supply line, and these impedances are matched by the impedance converter 80 so that impedance can be converted without any signal losses. Further, the coupler 90 makes it possible to supply only a reflection signal to the detector 50 after attenuating the output signal components from the signal source 40 to less than 1%, whereby highly accurate operation is possible in the detector 50.

As described above, in this embodiment, it is possible to infallibly detect the flow of vehicles and any abnormal conditions by a plurality of conductive wires laid along the travelling path. Further, as a vehicle's movement within a lane can also be observed, management and control which is stricter than in prior arts is possible.

Instead of providing a plurality of conductive wires along the travelling path, a single conductive wire may be provided within a path in a winding manner. Although this slightly reduces the area to be monitored, continuous monitoring of the situation within the path is still possible with a reduced number of conductive wires.

SECOND EMBODIMENT

In the foregoing first embodiment, conductive wires are provided along the travelling path. In this embodiment, an optical fiber is provided along the travelling path.

Figure 7:
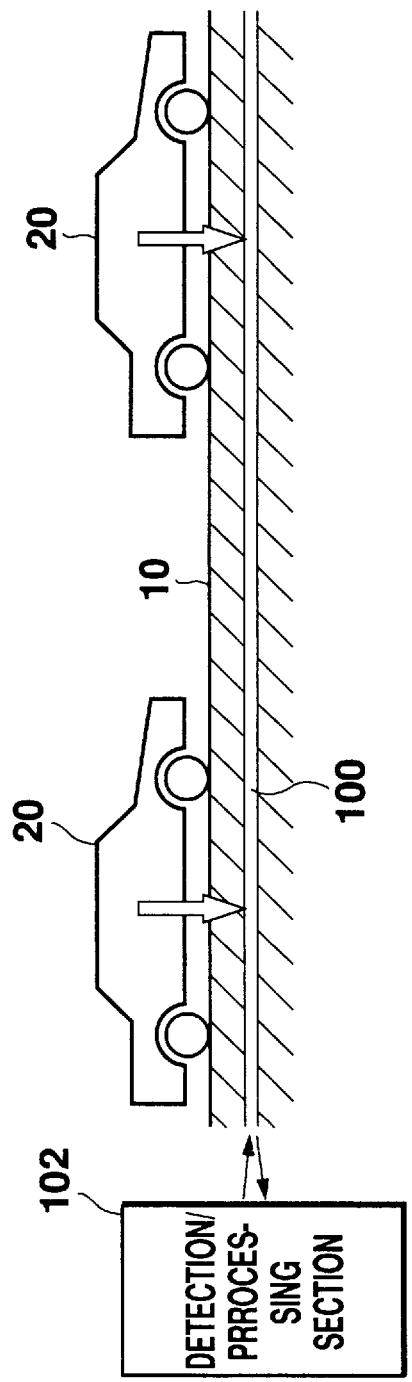
FIG. 7 is a structural block diagram of a second embodiment of the present invention.

FIG. 7 shows the structure of this embodiment. As shown in the figure, an optical fiber 100 is embedded under the surface of the road at a predetermined position along the travelling path. A detection/processing section 102 is further provided for supplying a light beam to the optical fiber 100 as a signal and for receiving light reflected from the optical fiber to specify an object such as a vehicle 20 or the like.

Figure 8:
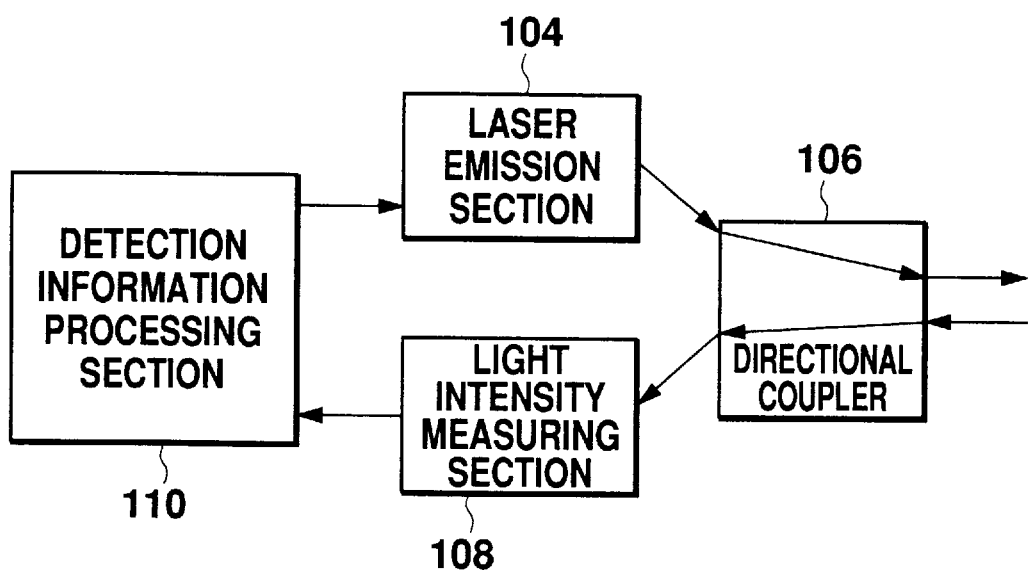
FIG. 8 is a structural block diagram of the detection/processing section of FIG. 7.

FIG. 8 shows a block diagram of a specific structure of the detection/processing section 102. The detection/processing section 102 comprises a laser emission section 104 for emitting a laser beam, a directional coupler 106 for transmitting the laser beam from the laser emission section 104 to the optical fiber 100 and separating light reflected from the optical fiber from the laser beam, a light intensity measuring section 108 for detecting the intensity of the reflected light obtained from the directional coupler 106, and a detection information processing section 110 for performing an operation to specify the position of an object. The wavelength of the laser beam can be set as desired. A semiconductor laser may be also used.

Figure 9A:
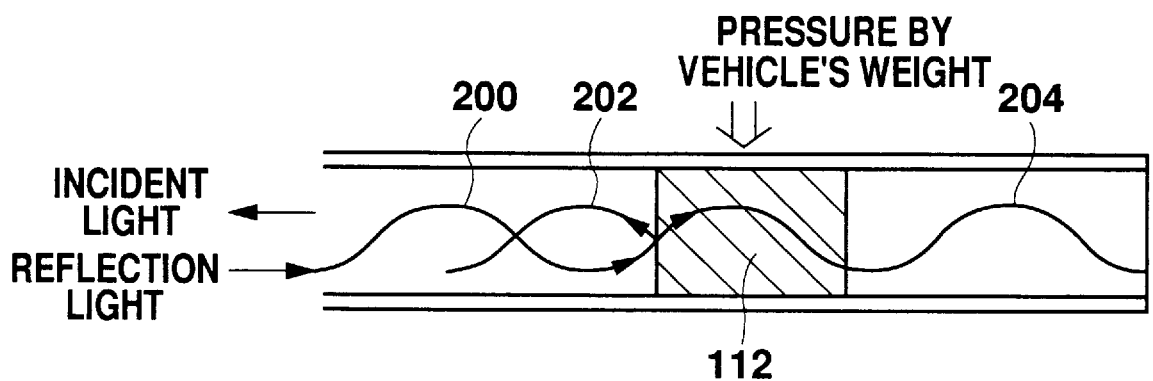
FIG. 9A is an explanatory view showing a relationship between a pressure caused by a vehicle weight and a signal.
Figure 9B:
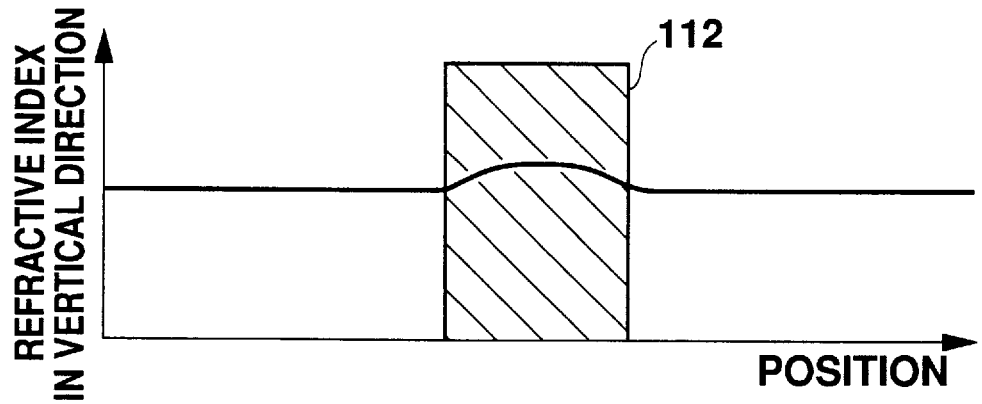
FIG. 9B is a graph showing changes in refractive index in the vertical direction according to a vehicle weight.
Figure 9C:
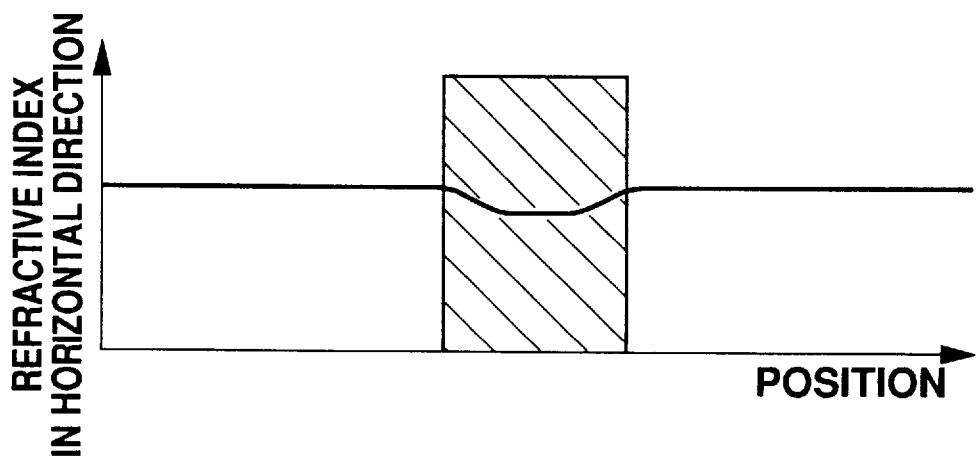
FIG. 9C is a graph showing changes in refractive index in the horizontal direction according to a vehicle weight.

FIGS. 9A to 9C show changes in refractive index of the optical fiber 100 when a vehicle 20 is present on the travelling path in which the optical fiber is laid. Specifically, FIG. 9A shows the propagation of light within the optical fiber. FIGS. 9B and 9C show changes in refractive index in the vertical direction and the horizontal direction, respectively. When a vehicle 20 is present, a pressure generated by the vehicle weight is applied to the optical fiber 100, thereby changing the refractive index of the optical fiber due to the so-called photoelastic effect. In general, when a pressure is applied in the vertical direction, the refractive index in the vertical direction increases while that in the horizontal direction decreases. The hatched portions in the drawings denote a refractive index change portion 112. Since the presence of a vehicle generates the refractive index change portion 112 within the medium of the optical fiber 100, an incident laser beam propagating within the optical fiber is reflected at this refractive index change portion 112. In FIG. 9A, numerals 200, 202, and 204 denote an incident laser beam, a reflection light reflected from the refractive index change portion or the position of a vehicle, and transmitted light, respectively.

Figure 10:
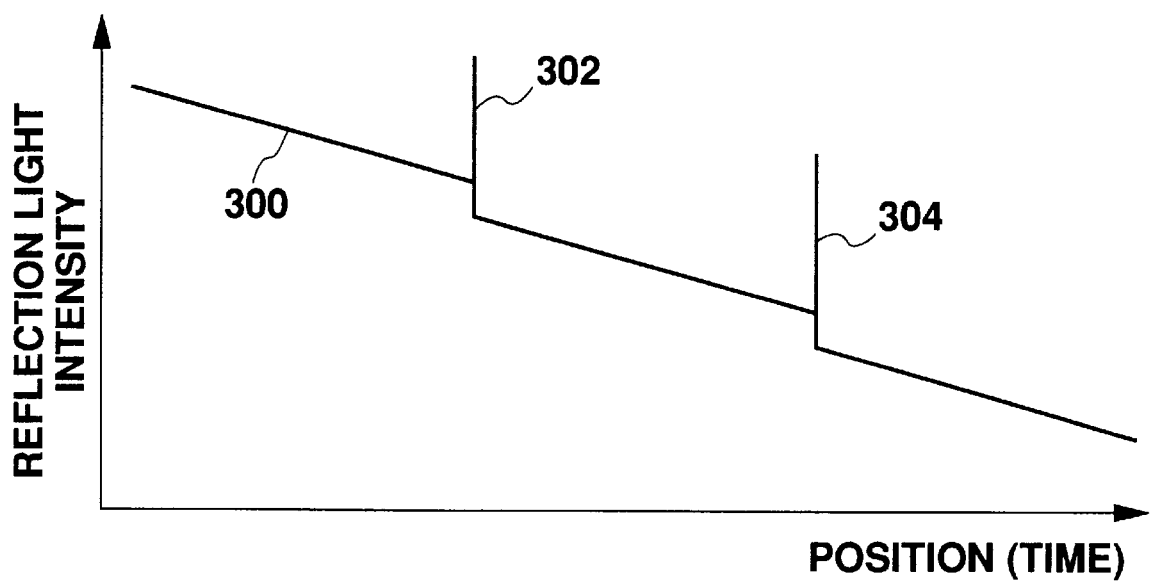
FIG. 10 is a graph showing a relationship between the position and reflection intensity.

FIG. 10 shows an example of temporal change in light intensity measured by the light intensity measuring section 108 when the refractive index changes as described above. In the figure, the vertical axis and the horizontal axis represent the reflected light intensity and the time elapsed after light emission, respectively. Since the elapsed time is proportional to the distance, the horizontal axis may also represent the position of the vehicle. In the optical fiber 100, light scattering which is proportional to a laser beam intensity always occurs. Due to this scattering, so-called backscattering light is continuously detected as reflected light regardless of changes in the refractive index. On the other hand, the reflected light from the refractive index change portion 112 is detected as discontinuous peaks 302, 304. Here, the intensity of reflected light is decreased after the peaks. This is because the light intensity decreases as part of the light is reflected while the remaining light is transmitted, and thus the intensity of the backscattering light also decreases. The discontinuous peak positions 302 and 304 represent the position of the vehicle 20. Actually, since the time required for light reflection is extremely short, the distance can be calculated by detecting the phase difference between the reflected light and the incident light.

This embodiment has been described with respect to the case where the vehicle 20 exists. However, it is needless to say that any objects, whether they are still or moving, can also be detected, as long as they have sufficient weight to apply pressure onto the optical fiber 100. It should be also understood that a plurality of optical fibers may be provided along the travelling path as in the first embodiment so that the situation where vehicles or the like stop or move can be detected without fail.

Further, in the foregoing embodiments, inductive cables and optical fibers are used as examples. However, it is to be noted that any techniques using other signal forms and signal propagation media are within the technical scope of the present invention, since the essential point of the present invention lies in generation of reflected signals due to characteristic change in signal propagation medium caused by the presence of a vehicle or the like.

As described above, according to the present invention, any objects present on a travelling path can be infallibly detected regardless of weather or time, to thus correctly realize the traffic condition of vehicles or the like, thereby enabling traffic control to be performed more accurately compared to the prior arts.

What is claimed is:

1. An on-road object detecting system comprising:

propagating means for propagating a signal along a travelling path and having propagation characteristics that change due to the presence of an on-road object;

signal generating means for feeding the signal to the propagating means;

the signal propagated by the propagating means being reflected not from the object but in the propagating means at the occurrence of a change in the propagation characteristics;

signal receiving means for receiving the reflection signal reflected from the change in propagation characteristics of the propagation means caused by the on-road object; and detecting means for detecting the position of the on-road object based on the timing of the received reflection signal at the signal receiving means.

2. An on-road object detecting system according to claim 1, wherein said propagating means is at least one conductive wire having a predetermined impedance value and said change in propagation characteristics occurs in the at least one conductive wire where an impedance inconsistency is caused by the on-road object.

3. An on-road object detecting system according to claim 1, wherein said propagating means is an optical fiber having a predetermined refractive index and said change in propagation characteristics occurs in the optical fiber where the refractive index is changed due to the on-road object.

4. An on-road object detecting system according to claim 1, wherein an on-road object may undergo a positional change, a plurality of the propagating means are located in the direction of width of the travelling path, and the detecting means detects the position of the on-road object at each of the propagating means, the system further comprising judging means for judging at least the type of on-road object based on the positional change of the on-road object as time elapses.

5. An on-road object detecting system according to claim 4, wherein each of said plurality of propagating means is at least one conductive wire having a predetermined impedance value and said change in propagation characteristics occurs in each of the at least one conductive wire where an impedance inconsistency is caused by the on-road object.

6. An on-road object detecting system according to claim 4, wherein each of said plurality of propagating means is an optical fiber having a predetermined refractive index and said chance in propagation characteristics occurs in each of the optical fibers where the refractive index is changed due to the on-road object.

7. An on-road object detecting system comprising:

a cable for propagating a signal along a travelling path and having propagation characteristics that change due to the presence of an on-road object;

a signal generator for supplying a signal to the cable;

the signal being propagated in the cable being reflected not from the object but in the cable at the occurrence of a change in the propagation characteristics;

a signal receiver for receiving the reflection signal reflected from the change in propagation characteristics caused by the on-road object; and a processor for detecting the position of the on-road object based on the timing of the received reflection signal at the signal receiver.

8. An on-road object detecting system according to claim 7, wherein said cable is at least one conductive wire having a predetermined impedance value, and said signal generator supplies an alternating signal to the cable.

9. An on-road object detecting system according to claim 7, wherein said cable is at least one conductive wire having a predetermined impedance value, and said signal generator supplies a pulse signal to the cable.

10. An on-road object detecting system according to claim 7, wherein said cable is an optical fiber having a predetermined refractive index, and said signal generator supplies a laser beam to the cable.

* * * * *